United States Patent
Dudar

(10) Patent No.: US 11,702,996 B2
(45) Date of Patent: Jul. 18, 2023

(54) METHODS AND SYSTEM FOR ENGINE BRAKING VIA ELECTRIC BOOSTING DEVICE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/651,393

(22) Filed: Feb. 16, 2022

(65) Prior Publication Data

US 2022/0243671 A1    Aug. 4, 2022

Related U.S. Application Data

(62) Division of application No. 17/164,348, filed on Feb. 1, 2021, now Pat. No. 11,300,060.

(51) Int. Cl.
| | |
|---|---|
| *F02D 9/06* | (2006.01) |
| *F02D 23/00* | (2006.01) |
| *F02D 17/02* | (2006.01) |

(52) U.S. Cl.
CPC ............... *F02D 9/06* (2013.01); *F02D 17/02* (2013.01); *F02D 23/00* (2013.01)

(58) Field of Classification Search
CPC .. F01L 13/06; F02D 9/06; F02D 41/12; F02D 41/1448; F02D 13/04
USPC ................................. 123/319, 320, 321, 323
See application file for complete search history.

(56) References Cited

U.S. PATENT DOCUMENTS

| | | | |
|---|---|---|---|
| 6,293,248 B1 | 9/2001 | Zsoldos et al. | |
| 6,594,996 B2 | 7/2003 | Yang | |
| 7,748,355 B2 | 7/2010 | Megli et al. | |
| 9,174,633 B2 | 11/2015 | Lee et al. | |
| 11,105,277 B1 | 8/2021 | Dudar | |
| 11,300,060 B1* | 4/2022 | Dudar | F02D 9/06 |
| 11,339,728 B1* | 5/2022 | Martin | F02D 41/0007 |
| 11,514,803 B2* | 11/2022 | Miller | G01S 19/42 |
| 2016/0169127 A1 | 6/2016 | Rammer et al. | |
| 2018/0236997 A1* | 8/2018 | Quix | B60W 50/0097 |
| 2019/0063377 A1 | 2/2019 | Dudar | |
| 2020/0122709 A1* | 4/2020 | Cunningham | F02D 13/0207 |
| 2020/0156643 A1 | 5/2020 | Hu et al. | |
| 2021/0262393 A1 | 8/2021 | Leone et al. | |
| 2022/0010883 A1* | 1/2022 | Willey | F02B 37/025 |

* cited by examiner

*Primary Examiner* — John Kwon
(74) *Attorney, Agent, or Firm* — Vincent Mastrogiacomo; McCoy Russell LLP

(57) ABSTRACT

Methods and systems are provided for engine braking in a vehicle. In one example, a method may include deactivating fueling to at least one cylinder of an engine, increasing an air mass provided to the engine via an electric boosting device, and adjusting an exhaust valve opening timing of the at least one cylinder in response to a request for engine braking. In this way, an amount of engine braking torque may be increased with reduced wear to engine system components.

4 Claims, 7 Drawing Sheets

METHODS AND SYSTEM FOR ENGINE BRAKING VIA ELECTRIC BOOSTING DEVICE

CROSS REFERENCE TO RELATED APPLICATION

The present application is a divisional of U.S. Non-Provisional patent application Ser. No. 17/164,348, entitled "METHODS AND SYSTEM FOR ENGINE BRAKING VIA ELECTRIC BOOSTING DEVICE", and filed on Feb. 1, 2021. The entire contents of the above-listed application are hereby incorporated by reference for all purposes.

FIELD

The present description relates generally to methods and systems for an electrically boosted engine system.

BACKGROUND/SUMMARY

Engine braking may be used by an operator controlling a vehicle to reduce a possibility of brake fade of friction brakes. Brake fade refers to overheating of a brake pad/rotor that may result in the braking function and/or components degrading. For example, brake fade may occur due to a reliance on friction braking when descending a long hill. To prevent brake fade, the operator may shift to a lower transmission gear ratio to force the engine to perform more work and adsorb a gravitational energy propelling the vehicle. The braking function is thus shared between the engine and the friction brakes.

However, lowering the transmission gear ratio may result in additional engine wear and noise, vibration, and harshness (NVH). For example, the engine speed may be increased when the gear ratio is lowered, which leads to higher NVH and puts more demand on a lubrication system of the engine, moving parts of the engine, etc. In some examples, downshifting may also put more demand on the transmission itself, such as when the vehicle is towing a load (e.g., a trailer). Thus, other methods that increase engine braking while lowering the engine speed may help reduce brake fade while also reducing NVH and engine system degradation.

Further, engines may be configured with boosting devices, such as turbochargers or superchargers, to increase air flow into a combustion chamber. Turbochargers and superchargers compress intake air entering the engine using an intake compressor. While a turbocharger includes a compressor that is mechanically driven by an exhaust turbine, an electric supercharger (also referred to herein as an electric boosting device or e-booster) includes a compressor that is electrically driven by a motor. In some engine systems, multiple intake charging devices may be staged in series or in parallel in what may be referred to as a compound boosting configuration. For example, a fast, auxiliary boosting device (e.g., the electric supercharger) may be utilized to increase a transient performance of a slower, larger boosting device (e.g., the turbocharger). However, the electric supercharger adds significant cost to the engine system while having utility during a small range of operating conditions.

The inventor herein has advantageously recognized that the electric supercharger may be used to increase engine braking, thereby decreasing friction brake degradation, engine system degradation, and NVH while also increasing a utility and value of the electric supercharger.

In one example, the issues described above may be addressed by a method, comprising: in response to a request for engine braking: deactivating fueling to at least one cylinder of an engine, increasing an air mass provided to the engine via an electric boosting device, and adjusting an exhaust valve opening timing of the at least one cylinder. In this way, the electric boosting device may be used on-demand to increase the air mass provided to the engine, thereby increasing an amount of energy used during compression to increase a brake torque produced by the engine.

As one example, adjusting the exhaust valve opening timing of the at least one cylinder may include advancing the exhaust valve opening timing of the at least one cylinder within a power stroke of the at least one cylinder. For example, the exhaust valve opening timing may be advanced to at least a threshold crank angle within the power stroke of the at least one cylinder. The threshold crank angle may be outside of a nominal exhaust valve opening timing range that is used during combustion. For example, advancing the advancing the exhaust valve opening timing to at least the threshold crank angle may release the increased air mass from the at least one cylinder prior to an expansion of the increased air mass within the at least one cylinder counter-balancing the amount of energy used during compression. In some examples, the request for engine braking is responsive to an anticipated downhill descent of the vehicle. For example, the downhill descent may be anticipated based on learned driving routes of the vehicle. Additionally or alternatively, the downhill descent may be anticipated based on global positioning data.

Further, increasing the air mass provided to the engine by the electric boosting device may include spinning a compressor of the electric boosting device at a desired non-zero speed via an electric motor that draws current from either a regeneration device or a battery based on a requested brake torque of the request for engine braking and a state of charge of the battery. For example, the regeneration device may be mechanically coupled to the engine, and drawing current from the regeneration device may increase a load on the engine to further increase the brake torque produced. However, when the state of charge of the battery is high, such as above a threshold state of charge indicating the battery is full, it may instead be desired to draw the current from the battery in order to enable subsequent battery charging events, such as regenerative braking.

By adjusting the exhaust valve opening timing in combination with operating the electric boosting device to increase the air mass delivered to the engine, engine braking may be provided with reduced NVH and engine system degradation compared with down-shifting. Further, because the electric boosting device generates boost on-demand, the electric boosting device may provide the increased air mass during conditions when a non-electric boosting device, such as a turbocharger, may be ineffective. As a result, the engine braking may slow the vehicle (or reduce vehicle acceleration due to gravity during a downhill descent) with reduced friction brake usage, thereby reducing brake fade. In this way, a frequency of friction brake replacement may be decreased due to reduced degradation and wear on the friction brakes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

The following description relates to systems and methods for engine braking of vehicle. The vehicle may include the engine system schematically shown in FIG. 1A, which includes an electric supercharger positioned upstream of a turbocharger. Each engine cylinder may have the example configuration shown in FIG. 1B. For example, intake and exhaust valves of each cylinder may be each controlled via a variable valve timing system, such as a variable cam timing system, that may enable an exhaust valve timing to be independently adjusted from an intake valve timing. The electric supercharger and the variable valve timing system may be used synergistically to provide engine braking, such as according to the method of FIG. 2. As an example, the exhaust valve timing may be further advanced within a power stroke of a corresponding cylinder when engine braking is requested compared to when combustion is requested, as shown in the example timing charts of FIGS. 5 and 4, respectively, in order to release an increased air charge provided by the electric supercharger during engine braking. Further, in some examples, a controller of the vehicle may learn driving routes in order to anticipate a downhill descent according to the example method of FIG. 3, thereby enabling the controller to request engine braking with reduced mechanical (e.g., friction) brake usage. An example timeline for operating the electric supercharger and adjusting the exhaust valve timing when engine braking is requested is shown in FIG. 6.

Figure 1A:
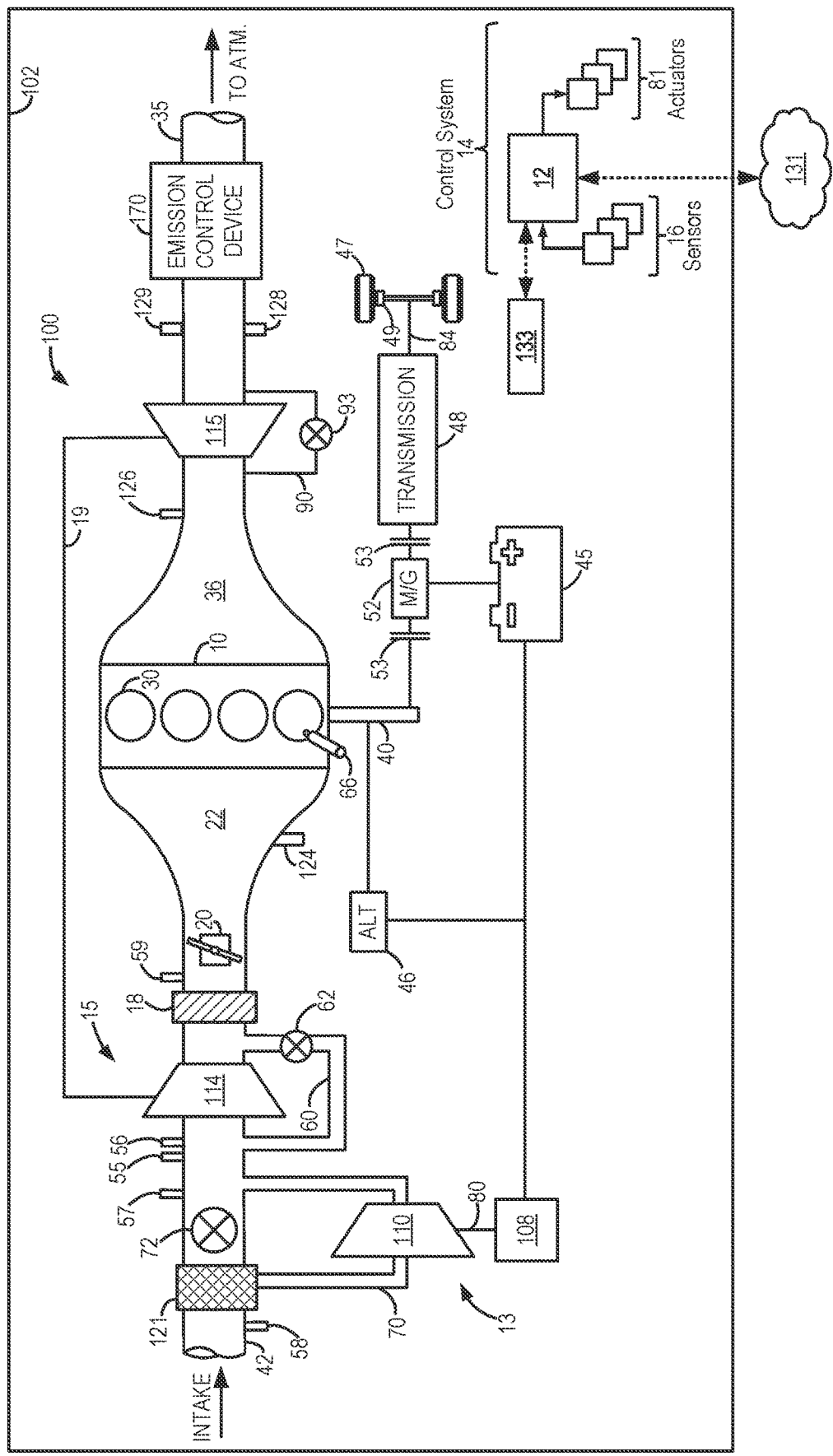
FIG. 1A schematically shows an exemplary boosted engine system having multiple staged intake compression devices.

Turning now to the figures, FIG. 1A schematically shows aspects of an example engine system 100, including an engine 10 coupled in a vehicle 102. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission.

Vehicle wheels 47 may include mechanical brakes 49 to slow the rotation of vehicle wheels 47. Mechanical brakes 49 may include friction brakes, such as disc brakes or drum brakes, or electromagnetic (e.g., electromagnetically-actuated) brakes, for example, both friction brakes and electromagnetic brakes configured to slow the rotation of vehicle wheels 47, and thus the linear motion of vehicle 102. As an example, mechanical brakes 49 may include a hydraulic brake system comprising brake calipers, a brake servo, and brake lines configured to carry brake fluid between the brake servo and the brake calipers. Mechanical brakes 49 may be configured such that a braking torque applied to wheels 47 by the brake system varies according to the pressure of brake fluid within the system, such as within the brake lines. Furthermore, referring now to FIG. 1B, a vehicle operator 113 may depress a brake pedal 117 to control an amount of braking torque supplied by mechanical brakes 49 (shown in FIG. 1A), such as by controlling the pressure of brake fluid within the brake lines, to slow vehicle 102 and/or hold vehicle 102 stationary. For example, a brake pedal position sensor 119 may generate a proportional brake pedal position signal BPP, which may be used to determine the amount of braking torque requested by vehicle operator 113. Further, as will be elaborated herein, mechanical brakes 49 may be used in combination with engine braking to slow vehicle 102. For example, mechanical brakes 49 may be engaged when engine braking alone is unable to provide the requested braking torque.

Returning to FIG. 1A, the powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as an electric generator to provide electrical power to charge system battery 45, for example, during a regenerative braking operation. It will be appreciated that in other embodiments, including non-electric vehicle embodiments, system battery 45 may be a typical starting, lighting, ignition (SLI) battery coupled to an alternator 46.

Alternator 46 may be an electric generator configured to charge system battery 45 using engine torque drawn from crankshaft 40 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems, as described further below, based on their corresponding electrical demands. In one example, a current drawn on alternator 46 may continually vary based on each of an operator cabin cooling demand, a battery charging demand, other auxiliary vehicle system demands, and a motor torque. A voltage regulator may be coupled to alternator 46 in order to regulate the power output of the alternator based upon system usage demands, including auxiliary system demands.

In the depicted example, engine 10 includes a plurality of cylinders (e.g., combustion chambers) 30, an example of which will be described with respect to FIG. 1B. Further, engine 10 is a compound boosted engine configured with multiple, staged boosting devices. Specifically, engine 10 includes a first boosting device staged upstream of a second boosting device. Herein, the first boosting device is an auxiliary boosting device and the second boosting device is a primary boosting device, although other configurations may be possible. The depicted configuration results in a first compressor 110 (of the first boosting device) being positioned in an engine intake passage 42 upstream of a second compressor 114 (of the second boosting device). At least one of the boosting devices may be configured with electric assistance from an electric motor. In the present example, the first boosting device is an electric supercharger 13, also referred to as an e-booster, operated via an electric motor 108, while the second boosting device is a turbocharger 15. However, other combinations and configurations of boosting devices may be possible without departing from the scope of this disclosure. For example, in alternative examples, turbocharger 15 may be an electrically assisted turbocharger having an electric motor coupled to the compressor, turbine, or turbocharger shaft while the supercharger is configured as an electrical or mechanical supercharger. In other examples, both the first and second boosting device may be electric superchargers or electrically assisted turbochargers. In still other examples, only one boosting device may be included, such as an electrically assisted turbocharger.

In the depicted example, electric supercharger 13 includes first compressor 110, which is driven by electric motor 108. Specifically, compressor blades of first compressor 110 may be driven by power received from electric motor 108 along a supercharger compressor shaft 80. Electric motor 108 may be powered by an on-board energy storage device, such as system battery 45. Electric motor 108 may be additionally or alternatively powered directly by alternator 46 and/or electric machine 52. An amount of electrical power delivered to electric motor 108 may be varied in order to adjust a speed of electric supercharger 13. In one example, the amount of electric power delivered to electric motor 108 may be increased to increase the speed of first compressor 110, with a corresponding increase in the electrical load applied on alternator 46 or system battery 45. As a result of powering electric motor 108, electric supercharger 13 may be rapidly spun up, providing for a fast-acting or high frequency boost actuation.

During selected conditions, air may enter first compressor 110 when the opening of an electric supercharger bypass valve (ESBV) 72 is decreased, thereby directing incoming air from an air box 121 through a first compressor bypass passage 70 and first compressor 110, where it is pressurized for delivery to the second compressor 114. Fresh air received at an inlet of second compressor 114 is then compressed and introduced into engine 10. As the opening of ESBV 72 increases, an amount of air entering second compressor 114 without having passed through first compressor bypass passage 70 and first compressor 110 increases. During conditions when ESBV 72 is fully opened, compressed air may be delivered to engine 10 via second compressor 114 of turbocharger 15 only. By spinning up electric supercharger 13 via electric motor 108, a burst of boost pressure may be rapidly provided to the engine before turbocharger 15 is spun up.

In some examples, electric motor 108 may be configured as a motor-generator. Thus, during conditions when electric assistance is desired for boost build-up, electric motor 108 may provide positive torque to drive first compressor 110 to increase the transient boost pressure delivery. However, electric motor 108 also may be capable of energy recuperation by "braking" the motor shaft. Therein, negative torque may be applied to first compressor 110 (or shaft 80), reducing the compressor speed and concurrently charging the system battery (such as system battery 45) coupled to the motor.

Turbocharger 15 includes second compressor 114, which is driven by a turbine 115. Second compressor 114 is shown as a turbocharger compressor mechanically coupled to turbine 115 via a shaft 19, the turbine 115 driven by expanding engine exhaust. In one embodiment, turbocharger 15 may be a twin scroll device. In another embodiment, turbocharger 15 may be a variable geometry turbocharger (VGT), wherein turbine geometry is actively varied as a function of engine operating conditions.

Fresh air is introduced along intake passage 42 into engine 10 via air box 121 and flows to second compressor 114. During selected conditions, as elaborated below, air compressed by turbocharger 15 may be recirculated from an outlet to an inlet of second compressor 114 through a second compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve.

One or both of CRV 62 and ESBV 72 may be continuously variable valves wherein a position of the valve is continuously variable from a fully closed position to a fully open position. Alternatively, CRV 62 may be a continuously variable valve while ESBV 72 is an on-off valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., a compressor ratio, a compressor flow rate, a pressure differential across the compressor, etc.). In alternative examples, CRV 62 may be held closed during boosted engine operation (e.g., peak performance conditions) to decrease boost response time and increase peak performance.

Second compressor 114 is coupled to a throttle valve 20 through a charge-air cooler (CAC) 18 (also referred to as an intercooler herein). Air flows from second compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown in FIG. 1A). The combustion chambers are further coupled to an exhaust manifold 36 via a series of exhaust valves (not shown in FIG. 1A). In the depicted example, a single exhaust manifold 36 is shown. However, in other examples, the exhaust manifold may include a plurality of exhaust manifold sections. Configurations having a plurality of exhaust manifold sections may enable effluent from different combustion chambers to be directed to different locations in the engine system.

In one example, each of the exhaust and intake valves may be electronically actuated or controlled. In another example, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides a more optimal volumetric efficiency for the given operating conditions. As another example, the cam timing may be adjusted to provide engine braking, as will be elaborated herein. The intake and exhaust valves will be further described below with respect to FIG. 1B.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1A, each combustion chamber includes a fuel injector coupled thereto). Fuel may be delivered to fuel injector 66 by a fuel system (not shown in FIG. 1A) including a fuel tank, a fuel pump, and a fuel rail. In the combustion chambers, combustion may be initiated via spark ignition and/or compression ignition.

As shown in FIG. 1A, exhaust from exhaust manifold 36 is directed to turbine 115 to drive the turbine. When reduced turbine torque is desired, a portion of exhaust may be directed instead through a wastegate 90, bypassing the turbine. A wastegate actuator 93 (e.g., wastegate valve) may be actuated open to relieve at least some exhaust pressure from upstream of turbine 115 to a location downstream of turbine 115 via wastegate 90. By reducing exhaust pressure upstream of turbine 115, turbine speed may be reduced.

The combined flow from turbine 115 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of first compressor 110, the inlet of second compressor 114, or both.

One or more sensors may be coupled to the inlet of second compressor 114 (as shown) and/or first compressor 110 (not shown). For example, a temperature sensor 55 may be coupled to the inlet of second compressor 114 for estimating a compressor inlet temperature. As another example, a pressure sensor 56 may be coupled to the inlet of second compressor 114 for estimating a pressure of air entering the second compressor. Still other sensors may include, for example, air-fuel ratio sensors, humidity sensors, etc. In other examples, one or more of the second compressor inlet conditions (such as humidity, temperature, etc.) may be inferred based on engine operating conditions. The sensors may estimate a condition of the intake air received at the second compressor inlet from the intake passage as well as the air charge recirculated from upstream of CAC 18. One or more sensors may also be coupled to intake passage 42 upstream of first compressor 110 for determining a composition and condition of air charge entering the compressor. These sensors may include, for example, a pressure sensor 58. The pressure upstream of air box 121 may be barometric (e.g., atmospheric) pressure, for example. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost responsive to an increase in operator torque demand, turbo lag can occur. This is due to delays in turbine 115 spin-up due to the turbocharger being a slower-acting compression device, and a momentary reduction in flow through second compressor 114 when throttle valve 20 opens at the tip-in. The same may also occur when the engine is operating boosted and there is a transient increase in boost demand due to an increase in accelerator pedal application by the vehicle operator. To reduce this turbo lag, during those selected conditions, both electric supercharger 13 and turbocharger 15 may be enabled. In particular, the faster-acting electric supercharger 13 may be used to increase the transient boost response. Specifically, responsive to the tip-in, wastegate actuator 93 may be closed (e.g., fully closed) to increase exhaust flow through turbine 115. While turbine 115 spins-up, boost pressure may be transiently provided by first compressor 110. Enabling electric supercharger 13 may include drawing energy from system battery 45 to spin electric motor 108 and thereby accelerate first compressor 110. In addition, ESBV 72 may be closed (e.g., fully closed) to flow a larger portion of intake air through first compressor bypass passage 70 to be compressed by first compressor 110. In addition, CRV 62 may be closed (e.g., fully closed) to increase flow through second compressor 114. When turbine 115 has sufficiently spun up and turbocharger 15 is capable of providing the requested amount of boost, first compressor 110 may be spun down to rest by disabling electric motor 108 (e.g., by discontinuing the supply of power to electric motor 108 from system battery 45). In addition, ESBV 72 may be opened to enable a larger portion of air to bypass first compressor 110. As described further herein, activation (and deactivation) of first compressor 110 also may be used to magnify engine braking by increasing an amount of compressed air charge in combustion chambers 30.

During an operator tip-out event, when going from engine operation with boost to engine operation without boost (or reduced boost), compressor surge may occur. This is due to a decreased flow through second compressor 114 when throttle valve 20 closes at the tip-out. The reduced forward flow through second compressor 114 can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by second compressor 114 may be recirculated to the compressor inlet. This allows excess boost pressure to be substantially immediately relieved. In particular, CRV 62 may be opened to recirculate (warm) compressed air from the outlet of second compressor 114, upstream of CAC 18, to the inlet of second compressor 114. In some embodiments, the compressor recirculation system may additionally or alternatively include a recirculation passage for recirculating cooled compressed air from downstream of CAC 18 to the inlet of second compressor 114. In addition, wastegate actuator 93 may be moved to a more open (e.g., fully open) position so that more of the exhaust flow bypasses the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are also described herein). As one example, sensors 16 may include an exhaust gas sensor 126 located upstream of turbine 115, MAP sensor 124, an exhaust temperature sensor 128, an exhaust pressure sensor 129, compressor inlet temperature sensor 55, compressor inlet pressure sensor 56, a mass air flow (MAF) sensor 57, pressure sensor 58, and TIP sensor 59. Other sensors, such as additional pressure, temperature, air/fuel ratio, and composition sensors, may be coupled to various locations in engine system 100. The actuators 81 may include, for example, throttle valve 20, CRV 62, ESBV 72, electric motor 108, wastegate actuator 93, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as an example control routine described herein with regard to FIG. 2. As an example, responsive to a request for engine braking, controller 12 may adjust electric motor 108 of electric supercharger 13 to increase an air charge of unfueled cylinders.

Control system 14 may be communicatively coupled to other vehicles or infrastructures using appropriate communications technology. For example, control system 14 may be coupled to other vehicles or infrastructures via a wireless network 131, which may comprise Wi-Fi, Bluetooth, a type of cellular service, a wireless data transfer protocol, and so on. Control system 14 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles may be either directly communicated between vehicles or may be multi-hop. In some examples, longer range communications (e.g., WiMax) may be used in place of or in conjunction with V2V or V2I2V to extend the coverage area by a few miles. In still other examples, vehicle control system 14 may be communicatively coupled to other vehicles or infrastructures via wireless network 131 and the internet (e.g., the cloud).

Vehicle 102 may also include an on-board navigation system 133 (for example, a Global Positioning System, or GPS). Navigation system 133 may include one or more location sensors for assisting in estimating vehicle speed, vehicle altitude, vehicle position/location, etc. This information may be additionally used by controller 12 to infer engine operating parameters, such as local barometric pressure, as well as elevation changes. As discussed above, control system 14 may further be configured to receive information via the internet or other communication networks. Information received from navigation system 133 may be cross-referenced to information available via the internet to determine local weather conditions, local vehicle regulations, etc.

Figure 1B:
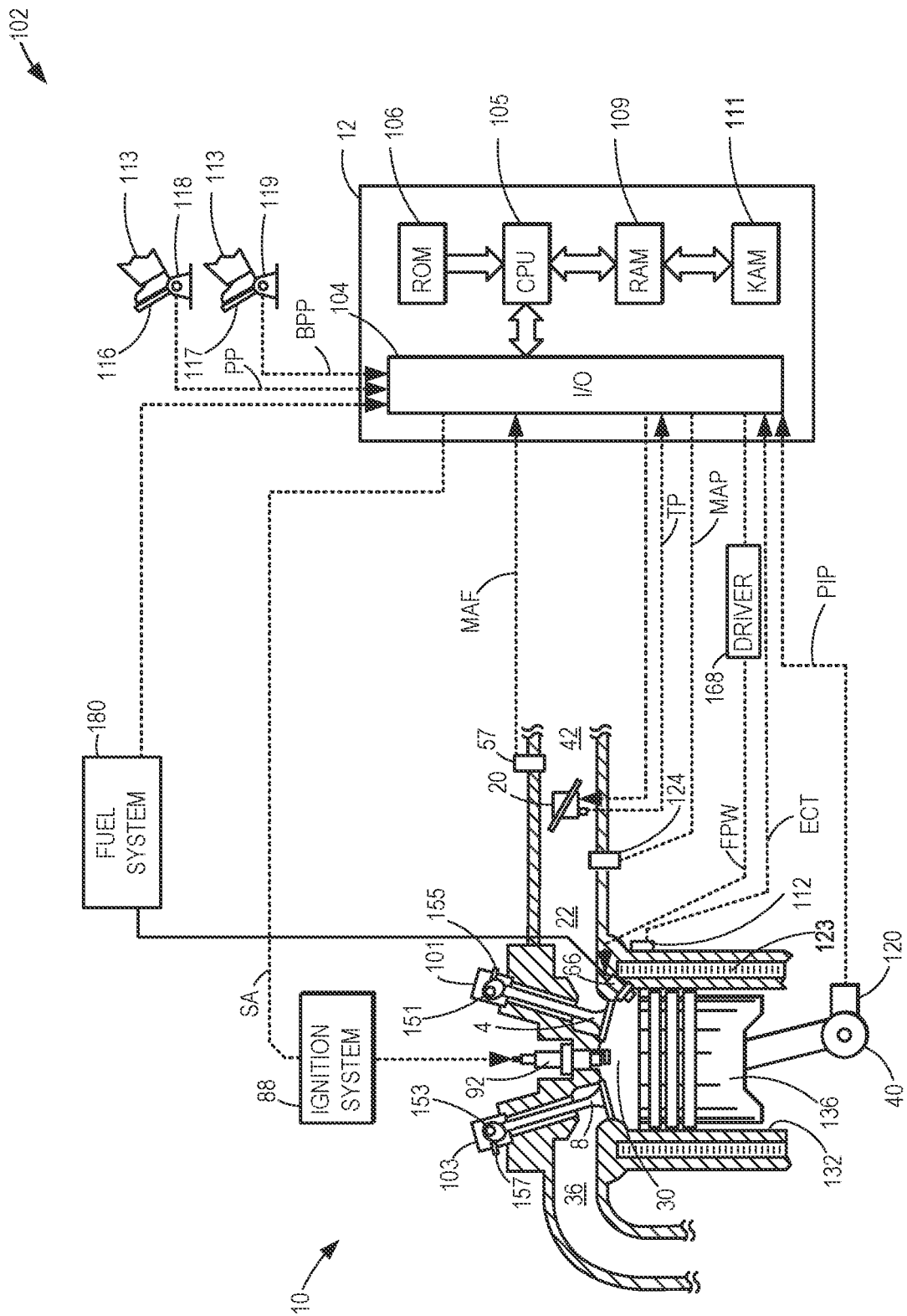
FIG. 1B shows an exemplary configuration of a single cylinder of the boosted engine system depicted in FIG. 1A.

Continuing to FIG. 1B, a partial view of a single cylinder 30 of engine 10 is shown. Cylinder (e.g., combustion chamber) 30 includes a coolant sleeve 123 and cylinder walls 132, with a piston 136 positioned therein and connected to crankshaft 40. Combustion chamber 30 is shown communicating with intake manifold 22 via an intake valve 4 and with exhaust manifold 36 via an exhaust valve 8.

In the depicted view, intake valve 4 and exhaust valve 8 are located at an upper region of combustion chamber 30. Intake valve 4 and exhaust valve 8 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151 positioned on an intake camshaft, and exhaust valve 8 is controlled by an exhaust cam 153 positioned on an exhaust camshaft. The intake cam 151 may be actuated via an intake valve timing actuator 101, and the exhaust cam 153 may be actuated via an exhaust valve timing actuator 103 according to set intake and exhaust valve timings, respectively.

For example, intake valve timing actuator 101 and exhaust valve timing actuator 103 may be included in a twin independent VCT system (e.g., Ti-VCT), and controller 12 may advance or retard the timing of the intake and exhaust camshafts independently. For example, intake valve timing actuator 101 may adjust a rotational position of the intake camshaft by adjusting a hydraulic pressure in an intake camshaft phaser cavity or via another mechanism. Similarly, exhaust valve timing actuator 103 may adjust a rotational position of the exhaust camshaft by adjusting a hydraulic pressure in an exhaust camshaft phaser cavity or via another mechanism. Rotating the intake camshaft or the exhaust camshaft from its initial orientation may cause a lobe of the corresponding cam to come into contact with the corresponding valve earlier (e.g., when advanced) or later (e.g., when retarded), thereby changing a timing at which the corresponding valve begins to open. By separately adjusting the intake and exhaust camshafts, engine power and torque may be increased, particularly at lower engine speeds. Further, fuel consumption and emissions may be reduced.

In some examples, intake valve 4 and exhaust valve 8 may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 30 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 30 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 30 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 30 is shown including one fuel injector 66. Fuel injector 66 is shown coupled directly to combustion chamber 30 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 30. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In another example, injector 66 may be a port injector providing fuel into the intake port upstream of cylinder 30.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via brake pedal 117 and brake pedal position sensor 119. Accelerator pedal position sensor 118 may send a pedal position signal (PP) to controller 12 corresponding to a position of accelerator pedal 116, and brake pedal position sensor 119 may send a brake pedal position (BPP) signal to controller 12 corresponding to a position of brake pedal 117. Controller 12 is shown in FIG. 1 as a microcomputer, including a microprocessor unit 105, input/output ports 104, an electronic storage medium for executable programs and calibration values shown as a read-only memory 106 in this particular example, random access memory 109, keep alive memory 111, and a data bus. Storage medium read-only memory 106 can be programmed with computer readable data representing instructions executable by microprocessor 105 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 57, an engine coolant temperature signal (ECT) from a temperature sensor 112 coupled to coolant sleeve 123, a profile ignition pickup signal (PIP) from a Hall effect sensor 120 (or other type) coupled to crankshaft 40, a throttle position (TP) from a throttle position sensor coupled to throttle 20, and an absolute manifold pressure signal (MAP) from MAP sensor 124 coupled to intake manifold 22. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle valve 20, spark plug 92, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 2 and 3.

As discussed above, friction brakes (e.g., mechanical brakes 49 shown in FIG. 1A) may be used to slow a vehicle. However, if the friction brakes overheat during use, brake fade may occur. Further, frequent usage of the friction brakes may increase a wear on brake system components, such as brake pads or drums, which may cause them to be replaced more frequently.

Figure 2:
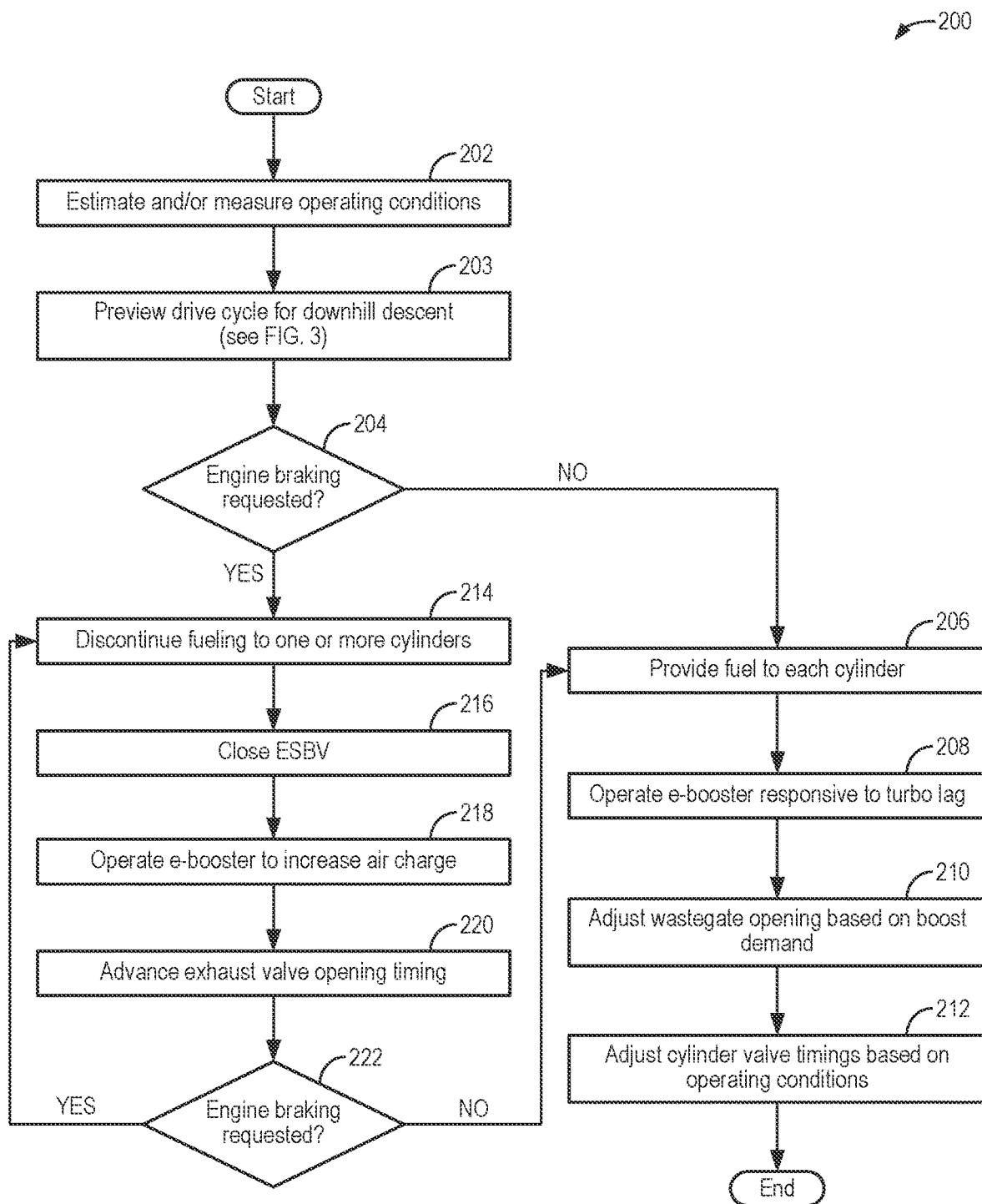
FIG. 2 shows a flow chart of an example method for utilizing an electric boosting device and advanced exhaust valve timing for engine braking.

Therefore, an example method 200 for engine braking a vehicle is shown in FIG. 2. The vehicle may be a hybrid or a conventional vehicle including an engine equipped with an e-booster, such as vehicle 102 shown in FIGS. 1A and 1B. Although method 200 will be described with respect to the engine system and components shown in FIGS. 1A and 1B, method 200 may be applied to other engine systems without departing from the scope of this disclosure. Instructions for carrying out method 200 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1 and elaborated below. The controller may employ actuators of the engine system to adjust engine operation according to the method described below.

At 202, method 200 includes estimating and/or measuring operating conditions. The operating conditions may include both engine and vehicle operating conditions. The engine operating conditions may include, for example, an engine speed, an intake manifold pressure (e.g., MAP), a mass air flow of intake air provided to the engine (e.g., MAF), an engine temperature, a torque demand, a boost demand, a fuel injection amount and timing, cylinder valve lift and timing settings, an exhaust gas temperature, a commanded AFR, a measured AFR, a spark timing, a brake pedal position, an accelerator pedal position, etc. As one example, the brake pedal position and the accelerator pedal position may be determined based on signals received from respective pedal position sensors (e.g., brake pedal position sensor 119 and accelerator pedal position sensor 118 of FIG. 1B, respectively). Together, the accelerator pedal position and the brake pedal position may be used by the controller to determine the torque demand, which may be a positive torque demand or a negative (e.g., braking) torque demand. Further, the vehicle operating conditions may include, for example, a vehicle speed, a state of charge of a system battery, a status of a drive cycle, etc.

At 203, method 200 includes previewing the drive cycle for a downhill descent. A method for learning driving routes during drive cycles of the vehicle will be described below with reference to FIG. 3. For example, a "drive cycle" may refer to a series of data points representing the speed and/or location of the vehicle with respect to time from vehicle-on to vehicle-off and may be stored in a memory of the controller. As will be elaborated below, the downhill descent may be learned or inferred from drive cycle data, such as due to an operator of the vehicle tipping out, a transient fuel shut off (TFSO) event occurring while the vehicle speed is relatively high, and on-board global positioning data combined with brake pedal application and/or shifting into a lower gear. Thus, the controller may anticipate that the current drive cycle (or current driving route) includes a downhill descent when the current drive cycle includes a learned driving route having a downhill descent.

At 204, method 200 includes determining if engine braking is requested. For example, engine braking may be requested responsive to a change in one or more of the accelerator pedal position and the brake pedal position. As an example, engine braking may be requested responsive to a tip-out event, where the accelerator pedal position changes from a depressed position to an undepressed, neutral position or a less depressed position. As another example, engine braking may be requested responsive to the brake pedal position increasing (e.g., being further depressed) and/or the transmission being down-shifted. As yet another example, engine braking may be requested responsive to a downhill descent, which may be determined and/or anticipated by comparing the current driving route and drive cycle status of the vehicle to the learned driving routes of the vehicle, for example. Additionally or alternatively, the downhill descent may be determined based on current global positioning data received from an on-board navigation system (e.g., on-board navigation system 133 of FIG. 1A) and/or a remote network (e.g., wireless network 131 of FIG. 1A). As still another example, engine braking may be requested responsive to a decrease in the demanded torque and/or in response to a non-zero requested brake torque, as determined from the accelerator pedal position and the brake pedal position. Further, in some examples, engine braking may be requested when the engine speed is greater than a threshold engine speed. The threshold engine speed may be a pre-determined, non-zero engine speed stored in memory below which further slowing the engine (e.g., via engine braking) may result in the engine inadvertently shutting off.

If engine braking is not requested, method 200 proceeds to 206 and includes providing fuel to each cylinder. As such, combustion may occur in each cylinder to produce the demanded torque. As an example, the controller may determine a pulse-width of a fuel signal to send to a fuel injector of each cylinder (e.g., signal FPW shown in FIG. 1) based on the demanded torque and/or an amount of air inducted into the engine (e.g., an air charge of each cylinder), such as by using a look-up table, algorithm or map that relates the demanded torque and/or the amount of air inducted into the engine to the pulse-width of the fuel signal. Further, the controller may transmit the fuel signal of the determined pulse-width to the corresponding fuel injector at a determined timing for the given operating conditions. In some examples, a total fuel amount may be distributed across multiple smaller injections delivered during an intake and/or compression stroke.

At 208, method includes operating the e-booster (e.g., electric supercharger 13 shown in FIG. 1A) responsive to turbo lag. As one example, turbo lag may be inferred responsive to an operator tip-in event, wherein the accelerator pedal position rapidly increases and an opening of a throttle valve increases accordingly. Additionally or alternatively, turbo lag may be determined responsive to an increase in the boost demand, such as when going from engine operation without boost (e.g., natural aspiration) to engine operation with boost or when the engine is already operating boosted and there is a rapid increase in the boost demand. In still another example, turbo lag may be indicated responsive to a shortfall in a boost amount provided by a turbocharger (e.g., turbocharger 15 shown in FIG. 1A) relative to the boost demand (e.g., requested amount of boost).

Operating the e-booster may include drawing electrical energy from a battery (e.g., system battery 45 of FIG. 1A) to drive an electric motor of the e-booster (e.g., electric motor 108 of FIG. 1A) to accelerate a compressor of the e-booster (e.g., first compressor 110 of FIG. 1A). As one example, the controller may adjust a duty cycle of the electric motor to operate the compressor of the e-booster at a desired speed. The desired speed may be determined based on a difference between the boost demand and the intake manifold pressure, for example, with the speed increasing as the difference increases. Additionally or alternatively, the controller may take into account the amount of boost provided by the turbocharger relative to the boost demand, such as based on a pressure ratio across a compressor of the turbocharger (e.g., second compressor 114 shown in FIG. 1A), with the speed of the e-booster compressor decreasing as the amount of boost provided by the turbocharger relative to the boost demand increases until the speed of the e-booster compressor is reduced to zero and the e-booster is no longer powered. In one example, the controller may input the boost demand and the amount of boost provided by the turbocharger into a look-up table, algorithm, or map stored in memory, which may output the desired speed of the e-booster for achieving the boost demand. The controller may then adjust the duty cycle of the electric motor to operate the e-booster at the desired speed.

Additionally, while the e-booster is operated at a non-zero speed, an electric supercharger bypass valve (ESBV) positioned to direct air to e-booster compressor (e.g., ESBV 72 shown in FIG. 1A) may be at least partially closed, with the ESBV further closed as the amount of boost provided by the e-booster is increased. In contrast, when the e-booster is not powered, such as when the turbocharger is able to provide the requested amount of boost or when boost is not requested, the ESBV may be maintained fully open in order to direct air to the compressor of the turbocharger without first flowing through the compressor of the e-booster.

At 210, method 200 includes adjusting a wastegate opening based on the boost demand. As an example, the controller may adjust a wastegate actuator (e.g., wastegate actuator 93 of FIG. 1A) to adjust the wastegate opening in order to increase or decrease exhaust flow through a turbine of the turbocharger (e.g., turbine 115 of FIG. 1A), thereby spinning up or slowing down the turbine and the mechanically coupled turbocharger compressor. For example, the wastegate opening may be further closed (or fully closed) to spin up the turbine and increase the amount of boost provided by the turbocharger, such as responsive to an increase in the boost demand. As another example, the wastegate opening may be further opened to decrease the amount of boost provided by the turbocharger, such as responsive to a decrease in the boost demand. In one example, the controller may input the boost demand into a look-up table, algorithm, or map stored in memory, which may output the wastegate opening to achieve the boost demand. The controller may then generate a control signal to adjust the wastegate actuator to provide the determined wastegate opening.

At 212, method 200 includes adjusting cylinder valve timings based on operating conditions. For example, an intake valve and an exhaust valve of each cylinder may be independently controlled via a Ti-VCT system, such as described above with respect to FIG. 1B. The controller may adjust an opening timing and a closing timing of each cylinder intake and exhaust valve via the Ti-VCT system, for example. As one example, to facilitate combustion in the cylinder, the intake valve of each cylinder may be held closed until it is opened during an intake stroke of the corresponding cylinder and may remain open until an end of the intake stroke or a beginning of a compression stroke, as will be illustrated with respect to FIG. 4. Further, the exhaust valve of each cylinder may be held closed until it is opened during an exhaust stroke of the corresponding cylinder and may remain open until the engine of the exhaust stroke or the beginning of the intake stroke, as will also be illustrated with respect to FIG. 4. Further, the controller may determine the opening timing and closing timing for the intake valve and the exhaust valve of each cylinder during each engine cycle based on the operating conditions, including the engine speed and the engine load. For example, the controller may input at least the engine speed and the engine load into one or more look-up tables, algorithms, or maps stored in memory, which may output the opening timing and closing timing for the intake valve and a separate opening timing and closing timing for the exhaust valve of each cylinder for the given engine cycle. In particular, in order to generate torque, the opening timing of the exhaust valve may be advanced or retarded within a threshold timing range with respect to bottom dead center (BDC) of a power stroke so that expanding combustion gases drive down a piston in each cylinder before being exhausted via the open exhaust valve. The controller may then adjust the corresponding VCT mechanism accordingly to provide the determined valve timings. Thus, the intake and exhaust valves may open and close to facilitate combustion during the four stroke engine cycle.

Method 200 may then end. For example, method 200 may be repeated at a pre-determined frequency during vehicle operation. As another example, method 200 may be repeated responsive to a detected change in one or more operating conditions, such as detected by a change in the output of the accelerator pedal position sensor and/or a change in the output of the pedal position sensor, for example.

Returning to 204, if engine braking is requested, method 200 proceeds to 214, and fueling is discontinued to one or more cylinders. In some examples, fueling is discontinued to every cylinder of the engine for a transient fuel shut off (TFSO) operation, wherein fueling is temporarily shut off to the entire engine while the vehicle speed is decreasing. In other examples, a portion of the cylinders may remain fueled while fueling is discontinued to the one or more cylinders so that the engine continues to produce torque. As an example, the controller may determine a number of cylinders to operate unfueled based on the requested (e.g., demanded) brake torque of the braking request, such as by inputting the requested brake torque into a look-up table, algorithm, or map stored in memory, which may output the number of cylinders to operate unfueled. As another example, the controller may make a logical determination regarding the number of cylinders to operate unfueled based on logic rules that are a function of the requested brake torque. In general, an amount of engine braking provided may increase as the number of unfueled cylinders increases. To discontinue fueling to the determined number of the one or more cylinders, the controller may discontinue sending the FPW signal the fuel injector of each of the one or more cylinders.

At 216, method 200 includes closing the ESBV. As described above at 208, by closing (e.g., fully closing) the ESBV, a larger portion (e.g., substantially all) of intake air may be directed to the compressor of the e-booster. Further, a throttle valve (e.g., throttle valve 20 introduced in FIGS. 1A and 1B) may be fully opened to reduce air flow restriction to the engine.

At 218, method 200 includes operating the e-booster to increase the air charge of each cylinder. As one example, operating the e-booster may include operating the e-booster at its maximum speed in order to increase the air charge by a greatest amount. For example, the controller may operate the electric motor of the e-booster at a maximum duty cycle (e.g., 100%) or may supply a maximum amount of voltage (or current) to the electric motor. In another example, operating the e-booster may include increasing the speed of the e-booster as the requested brake torque of the braking request increases until the maximum speed is increased. As an example, the controller may input the requested brake torque into a look-up table, algorithm, or map stored in memory, which may output a desired speed for operating the e-booster. The controller may then adjust the duty cycle of the electric motor to operate the e-booster (e.g., the compressor of the e-booster) at the desired speed. The increased air charge provided by the e-booster may exert a force against piston movement in each cylinder during a compression stroke (e.g., as the piston rises toward top dead center, TDC). As it takes more work/energy to compress the increased air charge (compared to when the e-booster is not operated), the additional energy is used to counteract the kinetic energy/gravity force that is propelling the vehicle and thus the engine. Thus, the force resisting piston movement may be a counterforce to the engine and the vehicle, resulting in the vehicle speed decreasing or not increasing (e.g., as would occur without braking when the vehicle is traveling downhill due to the gravity force) as the engine absorbs the kinetic energy/gravity force and acts as a brake.

Further still, operating the e-booster may include selecting whether to power the electric motor via the battery or via a regeneration device (e.g., alternator 46 or electric machine 52 of FIG. 1A). For example, drawing current from the regeneration device may increase the load on the engine, which may further enhance the engine braking. However, if the battery is fully charged, such as when the state of charge of the battery is greater than or equal to an upper charge threshold, it may be beneficial to draw current from the battery in order to enable subsequent regenerative braking, for example. The state of charge of the battery may refer to a current charge amount relative to a capacity and may be expressed as a percentage. The upper charge threshold may be a pre-determined, non-zero charge value stored in controller memory above which the battery is considered substantially fully charged. For example, the upper charge threshold may be in a range from 95-100%. As one example, the upper charge threshold may be 98%. Therefore, in some examples, the controller may select to power the electric motor of the e-booster directly from current generated by the regeneration device when the requested brake torque of the braking request is higher and/or when the state of charge of the battery is lower (e.g., lower than the upper charge threshold). For example, the controller may input the requested brake torque of the braking request and/or the state of charge of the battery into a look-up table, which may output the selection of the battery or the regeneration device. As another example, the controller may select between powering the electric motor of the e-booster with the battery or the regeneration device via logic rules that are a function of at least one of the state of charge of the battery and the requested brake torque.

At 220, method 200 includes advancing the exhaust valve opening timing to open the exhaust valve during the power stroke. Typically, the energy used to perform the compression work described above is balanced out by the energy gained during a power stroke. During the power stroke, the downward motion of the piston provides torque to a crankshaft of the engine. However, because engine braking is requested, it is not desirable to have the power stroke provide a magnified counterbalance torque, as when the compression is raised the power is also raised. Hence, the exhaust valve opening timing is advanced to open the exhaust valve early (e.g., earlier in the power stroke) to release the increased cylinder pressure into an exhaust manifold instead of delivering torque to the crankshaft. Further, in some examples, the intake valve opening timing may be advanced in order to induct more air into the cylinder.

For example, when the engine includes a Ti-VCT system, the controller may advance a phase angle of an exhaust camshaft relative to a crankshaft of the engine so that an exhaust cam rotating in unison with the exhaust camshaft lifts the exhaust valve sooner in the engine cycle, such as relatively early within the power stroke. An example of the exhaust valve opening timing during engine braking will be illustrated below with respect to FIG. 5. The degree to which the exhaust camshaft (and thus the exhaust valve opening timing) is advanced may be a fixed value for all engine braking requests that is stored in a memory of the controller. In other examples, the degree to which the exhaust camshaft is advanced may be varied based on the requested brake torque. For example, the controller may input the requested brake torque into a look-up table, algorithm, or map stored in memory, which may output the adjustment to the exhaust camshaft phase angle. As an example, the exhaust valve opening may be further advanced as the requested brake torque increases until a maximum advancement is reached (e.g., based on hardware of the Ti-VCT system) or TDC of the compression stroke is reached. In each example, the advanced exhaust valve opening timing may be at least a threshold number of crank angle degrees before BDC of the power stroke. The threshold number of crank angle degrees before BDC of the power stroke is a non-zero, positive number of crank angle degrees that is calibrated to marginalize the power produced in the power stroke and provide adequate engine braking. As one example, the threshold number of crank angle degrees may be 90 crank angle degrees. As another example, the threshold number of crank angle degrees may be 120 crank angle degrees. Further, the engine may not operate with the exhaust valve opening timing advanced by at least the threshold number of crank angle degrees before BDC of the power stroke when positive torque is requested. For example, the threshold number of crank angle degrees may not fall within the threshold timing range described above at 212. Note that other valve actuation systems may also be used to advance the exhaust valve opening timing in an analogous manner.

Thus, an overall amount of brake torque provided by the engine braking may be increased by increasing the air charge in the cylinders and exhausting the compressed air charge to the exhaust manifold during the power stroke. It may be understood that when the engine braking alone cannot meet the requested brake torque, friction brakes (e.g., mechanical brakes 49 of FIG. 1) may be engaged to provide the deficit.

At 222, it is again determined if engine braking is requested. For example, braking may no longer be requested responsive to a tip-in event, wherein the accelerator pedal is depressed and indicates an increased torque demand. Additionally or alternatively, the engine braking operation may be suspended even if engine braking continues to be requested. For example, the engine braking operation may be suspended responsive to a temperature of a catalyst decreasing below its light-off temperature in order to continue providing efficient emissions reduction. As another example, the engine braking operation may be suspended responsive to a temperature of a particulate filter increasing above an upper threshold temperature that corresponds to undesired combustion occurring within the particulate filter. If braking is not requested, or if it is desired to suspend the engine braking operation, method 200 proceeds to 206 and includes providing fuel each cylinder, as described above. For example, fueling may be resumed in the cylinders that were unfueled during the engine braking. In this way, the engine may be smoothly transitioned between producing negative torque to slow the vehicle and producing positive torque to propel the vehicle while also reducing vehicle emissions and reducing engine system component degradation.

Figure 3:
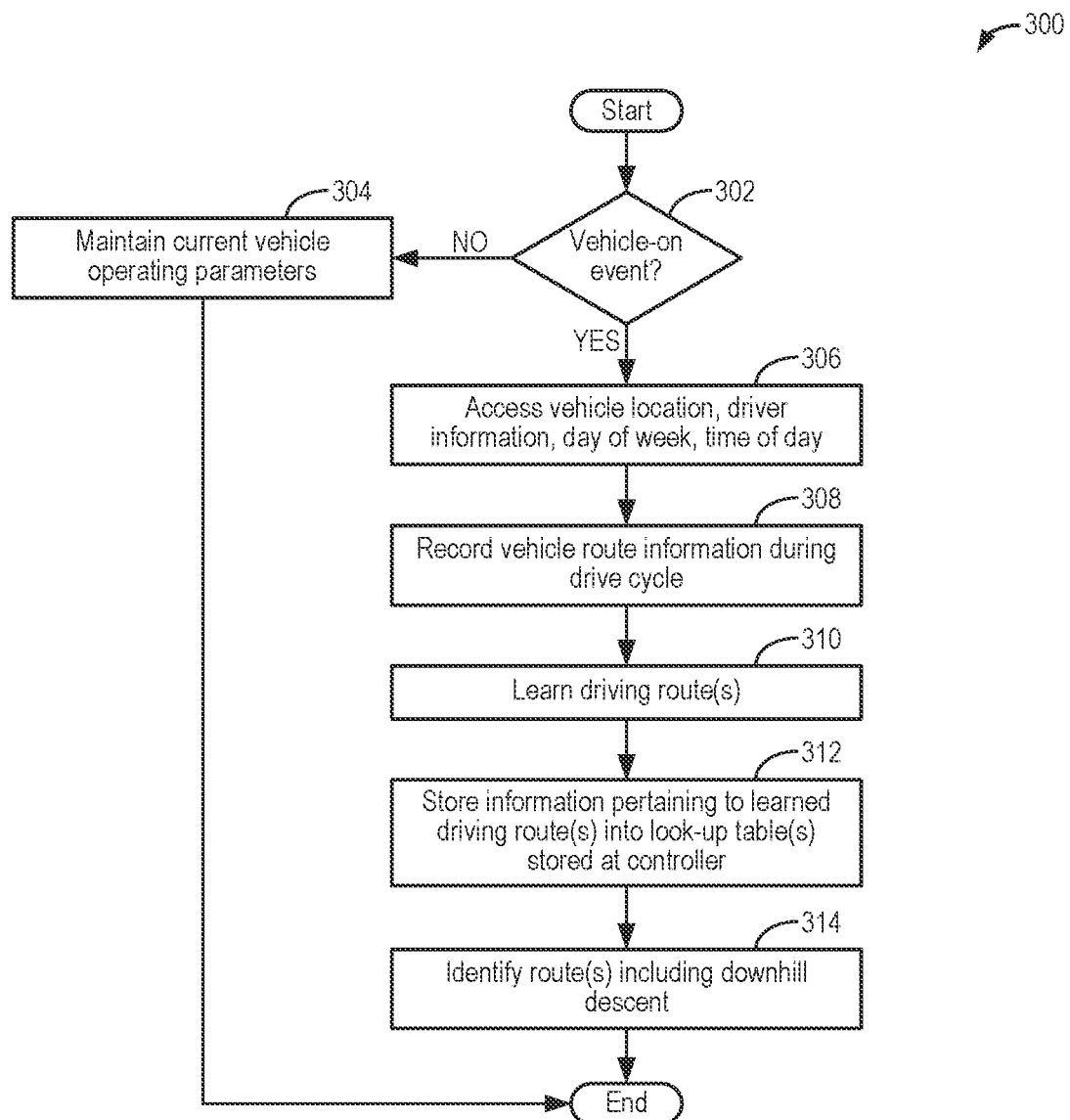
FIG. 3 shows a flow chart of an example method for learning driving routes during drive cycles of a vehicle.

Turning now to FIG. 3, a high level example method 300 for learning common driving routes driven in a vehicle is shown. More specifically, method 300 may be utilized to learn common driving routes in order to identify routes that include a downhill descent, during which an electric boosting device may be utilized for magnifying engine braking, as discussed in detail with respect to FIG. 2. Method 300 will be described with reference to the systems described herein and shown in FIGS. 1A and 1B, although it should be understood that similar methods may be applied to other systems without departing from the scope of this disclosure. Instructions for carrying out method 300 may be executed by a controller, such as controller 12 of FIGS. 1A and 1B, based on instructions stored on a memory of the controller and in conjunction with signals received from sensors vehicle system, such as the sensors described above with reference to FIGS. 1A and 1B.

At 302, method 300 includes determining whether a vehicle-on event is indicated. A vehicle-on event may comprise an ignition key being utilized to start the vehicle either in an engine-on mode (in which combustion is occurring in the engine, such as engine 10 of FIGS. 1A and 1B, and the resulting torque is used to propel the vehicle) or an electric-only mode of operation (in which the engine is off and an electric motor, such as electric machine 52 of FIG. 1A, is supplied power to propel the vehicle). In other examples, the vehicle-on event may comprise an ignition button being depressed to activate vehicle systems. Still other examples may include a key-fob (or other remote device, including a smartphone, a tablet, etc.) activating the vehicle in either the engine-on mode or the electric-only mode of operation.

If, at 302, the vehicle-on event is not indicated, method 300 proceeds to 304 and includes maintaining current vehicle operating parameters. For example, the engine, the electric motor, etc., may be maintained in their current modes of operation. Method 300 may then end.

Returning to 302, responsive to the vehicle-on event being indicated, method 300 proceeds to 306 and includes accessing vehicle location, driver information, day of the week (DOW), time of day (TOD), etc. An identity of the driver may be input by the driver or inferred based on driving habits, seat position, cabin climate control preferences, voice activated commands, etc. The vehicle location may be accessed via an onboard navigation system (e.g., on-board navigation system 133 of FIG. 1A), for example, via GPS, or via wireless communication with the internet (e.g., wireless network 131 of FIG. 1A), for example.

At 308, method 300 includes recording vehicle route information during a drive cycle commencing from the vehicle-on event. In some examples, vehicle route information may be divided into one or more segments, with the route beginning with a first vehicle-on event that indicates a start location and ending with a final vehicle-off event (e.g., removal of an ignition key or a key fob leaving a threshold proximity of the vehicle, during such conditions the engine and electric machines that propel the vehicle may stop rotating) that indicates a final destination. In contrast, segments may end with a vehicle-off event indicating a temporary destination. Temporary destinations may include vehicle-off events in which the vehicle is off for less than a threshold duration, whereas final destinations may include vehicle-off events in which the vehicle is off for at least the threshold duration. For example, the driver may stop for coffee on the way to work. The threshold duration may be a non-zero amount of time after which the engine may be cooled down (e.g., 1-3 hours).

The controller may continuously collect data from various sensor systems within the vehicle as well as outside sources regarding the operating conditions, location, traffic information, local weather information, etc. The data may be collected by, for example, by the on-board navigation system, inertial sensors, lasers, radar, sonar, acoustic sensors, etc. Other feedback signals from sensors such as tire pressure sensors, engine temperature sensors, brake sensors, fuel sensors, oil level and quality sensors, engine speed sensors, manifold pressure sensors, etc., may also be received by the controller. The controller may also retrieve various types of non-real time data, such as information from a detailed map, which may be stored at the controller or retrieved wirelessly. Accordingly, data regarding a particular vehicle driving route, or trip vector, may be obtained and stored at the vehicle controller during the course of the vehicle being driven along the particular route. Thus, segments may also be defined by other route information besides vehicle-on and vehicle-off events, such as vehicle location, vehicle speed, etc.

At 310, method 300 includes learning driving route(s). Learning the driving routes may include establishing predicted and/or frequently traveled driving routes. For example, numerous trip vectors and corresponding information may be obtained and stored at the vehicle controller such that driving routes may be predicted/learned with high accuracy. Predicted/learned driving routes may include routes that are frequented according to a daily, weekly, or monthly schedule (e.g., within a common time of day and day of the week) and further have a common starting location and final destination. In some examples, a vehicle may travel route(s) that are not frequently traveled (e.g., not "common"). Thus, it may be understood that route information that is not significantly correlated with commonly driven routes may be periodically forgotten or removed from the vehicle controller in order to prevent exorbitant amounts of data pertaining to vehicle travel routes from accumulating.

In some examples, data collected from the vehicle travel routes, including GPS data, may be applied to an algorithm that feeds into one or more machine learning algorithms to determine common vehicle travel routes. In other examples, any commonly used methodology for vehicle route learning may be utilized by the controller in order to establish learned travel routes without departing from the scope of this disclosure.

Learning the driving route(s) at 310 may further include determining vehicle-off events between and including a starting destination and a final destination. For example, learning the driving route(s) at 310 may include learning/predicting stops (e.g., vehicle-off events) that are typically less than the threshold duration (e.g., less than 1-3 hours) and may further include learning/predicting stops that are typically greater than the threshold duration (e.g., greater than 1-3 hours). Further, learning the driving route(s) at 310 may include learning average and peak vehicle speeds during each segment of the diving route as well as elevation changes during these speed ranges. As will be elaborated below, such information may be used by the controller to identify route(s) that include a downhill descent.

At 312, method 300 includes storing information pertaining to the learned driving routes into one or more lookup tables at the vehicle controller. Such information may include segments of particular driving routes, the time of day and day of the week each route is expected, an indication of routes in which a stop is indicated, average and peak vehicle speeds during the route, a learned/predicted duration of continuous engine-on activity above idle speed for each route segment, and global positioning information related to elevation gains and losses, for example. Further, the controller may use map and/or GPS data to determine which routes and/or route segments correspond to city drives and which routes and/or route segments correspond to highway drives as well as the topography (e.g., elevation changes) of the route. Such information may be correlated with driver inputs, such as accelerator pedal position and brake pedal position as well as transmission gear shifting.

At 314, method 300 includes identifying route(s) including a downhill descent. The route(s) including a downhill descent may include the vehicle experiencing at least a threshold decrease in elevation over no less than a threshold distance. The threshold distance may be a non-zero value stored in controller memory that corresponds to a minimum distance for distinguishing a sustained downhill descent versus, for example, a bump or other variations in grade. Similarly, the threshold decrease in elevation may be a non-zero value stored in controller memory that distinguishes decreases in elevation due to bumps or dips in the road from downhill descents. Such identified route(s) may be stored at the controller, such as in a lookup table. Additionally or alternatively, the identified route(s) may be stored in the cloud via the wireless network. Following 314, method 300 ends.

In this way, the methods of FIGS. 2 and 3 enable a controller to preview a drive cycle for a downhill descent at the beginning of a trip. By anticipating the downhill descent, the controller may activate an e-booster and adjust exhaust valve timing (e.g., via a Ti-VCT system) to absorb the motion of the vehicle, thereby slowing the vehicle (or preventing the vehicle from accelerating due to gravity) at a beginning of the downhill descent, prior to heavy mechanical brake usage. As a result, brake fade due to mechanical brake overheating may be decreased, and the engine may smoothly transition to engine braking. Further, the vehicle operator may avoid transmission degradation due to downshifting. Overall, customer satisfaction may be increased.

Figure 4:
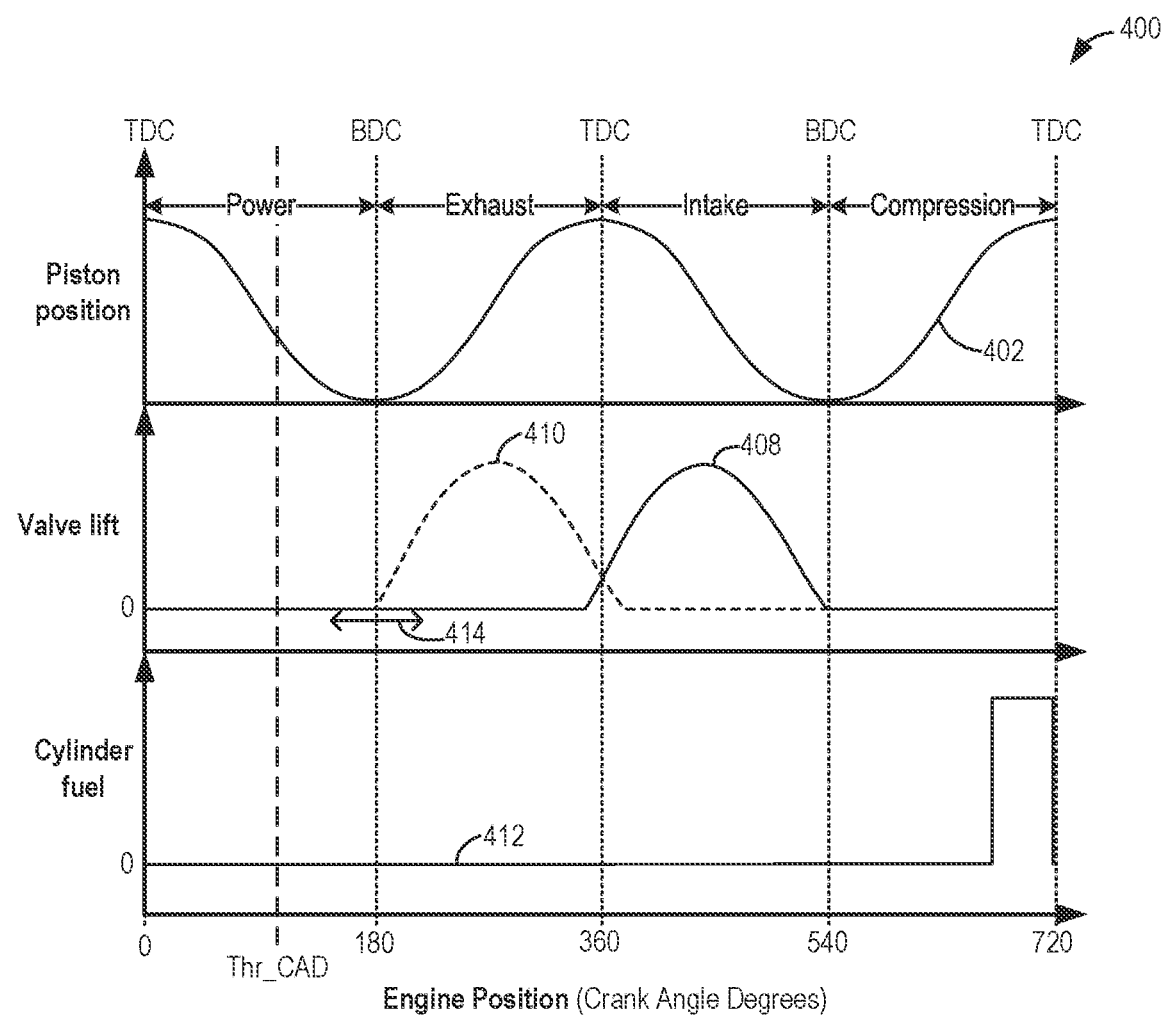
FIG. 4 shows an example timing chart of exhaust valve operation during combustion.

Turning now to FIG. 4, an exemplary timing chart 400 of operating a cylinder in a combustion mode is shown. The cylinder may be cylinder 30 of engine 10 shown in FIG. 1B, for example, with valve timing adjusted via a Ti-VCT system (e.g., intake valve timing actuator 101 and exhaust valve timing actuator 103 of FIG. 1B). Timing chart 400 shows one cylinder cycle, referring to four strokes of an engine cycle within the cylinder. A piston position relative to top dead center (TDC), bottom dead center (BDC), and the four strokes of the combustion cycle (intake, compression, power, and exhaust) is shown in a plot 402. Further, an intake valve lift is shown in a plot 408, an exhaust valve lift is shown in a dashed plot 410, and a cylinder fuel injection signal (e.g., as transmitted to a fuel injector of the cylinder, such as fuel injector 66 of FIGS. 1A and 1B) is shown in a plot 412. For all of the above, the horizontal axis represents engine position (e.g., in crank angle degrees), with the crank angle degrees (CAD) increasing from left to right. The vertical axis represents each labeled parameter. For plot 402, the vertical axis shows piston position relative to TDC and BDC. For plot 412, an increase in magnitude of the parameter above zero indicates actuation of the fuel injector. For plots 408 and 410, the lift of the corresponding valve increases up the vertical axis from zero. Further, the stroke of the combustion cycle is indicated at the top of timing chart 400. In the example shown, the power stroke corresponds to an interval from 0 CAD to 180 CAD, the exhaust stroke corresponds to an interval from 180 CAD to 360 CAD, the intake stroke corresponds to an interval from 360 CAD to 540 CAD, and the compression stroke corresponds to an interval from 540 CAD to 720 CAD.

Just prior to the start of the intake stroke (e.g., around 350 CAD), the intake valve is opened at an intake valve opening timing (plot 408). As shown in timing chart 400, an exhaust valve open duration may overlap with an intake valve open duration, in some examples. For example, after the start of the intake stroke (e.g., around 380 CAD), the exhaust valve is closed at an exhaust valve closing timing (dashed plot 410), resulting in positive valve overlap between the intake valve and the exhaust valve. During the intake stroke, air is introduced into the cylinder via the intake valve as the piston (plot 402) moves toward BDC, which is the point at which the piston is at its bottom-most position in the cylinder at the end of the intake stroke (e.g., when the combustion chamber is at its largest volume).

At the beginning of the compression stroke (e.g., around 540 CAD), the intake valve closes at an intake valve closing timing (plot 408). The piston (plot 402) moves toward the cylinder head so as to compress the air within the cylinder. The point at which the piston is at the end of its stroke and closest to the cylinder head (e.g., when the combustion chamber is at its smallest volume) is typically referred to as TDC. During the compression stroke, as the piston (plot 402) moves toward TDC, a cylinder fuel injection event introduces an amount of cylinder fuel (plot 412) into the cylinder before ignition at the end of the compression stroke (e.g., just before 720 CAD). The ignition triggers combustion in the cylinder, and because the intake valve (plot 408) and the exhaust valve (dashed plot 410) are both closed during the power stroke, the expanding combustion gases drive the piston back down toward BDC during the power stroke, producing positive engine torque. At the start of the exhaust stroke, exhaust valve opens at an exhaust valve opening timing (dashed plot 410), and the combustion gases are pushed out of the cylinder through the open exhaust valve as the piston rises toward BDC (plot 402).

Depending on operating conditions, the exhaust valve opening timing may be adjusted within a threshold timing range 414. For example, the exhaust valve opening timing may be advanced to occur earlier within threshold timing range 414, such as near an end of the power stroke, to increase an exhaust gas temperature. As another example, the exhaust valve opening timing may be retarded to occur later within the threshold timing range 414, such as further from BDC within the exhaust stroke. Further, threshold timing range 414 does not overlap with a threshold crank angle shown in FIG. 4 as Thr_CAD, which corresponds to the threshold number of crank angle degrees from BDC of the power stroke performing engine braking described above with respect to FIG. 2.

In this way, the intake and exhaust valve opening and closing timings facilitate combustion in the cylinder to produce positive engine torque. Note that the valve opening timings, closing timings, and lift amounts shown in FIG. 4 are exemplary, and other intake and exhaust valve opening timings, closing timings, and lift amounts that facilitate combustion may be used without departing from the scope of this disclosure. As one example, the intake valve and the exhaust valve may be operated without positive valve overlap, such as by adjusting the exhaust valve closing timing to occur earlier (e.g., during the exhaust stroke) and/or adjusting the intake valve opening timing to occur later (e.g., during the intake stroke).

Figure 5:
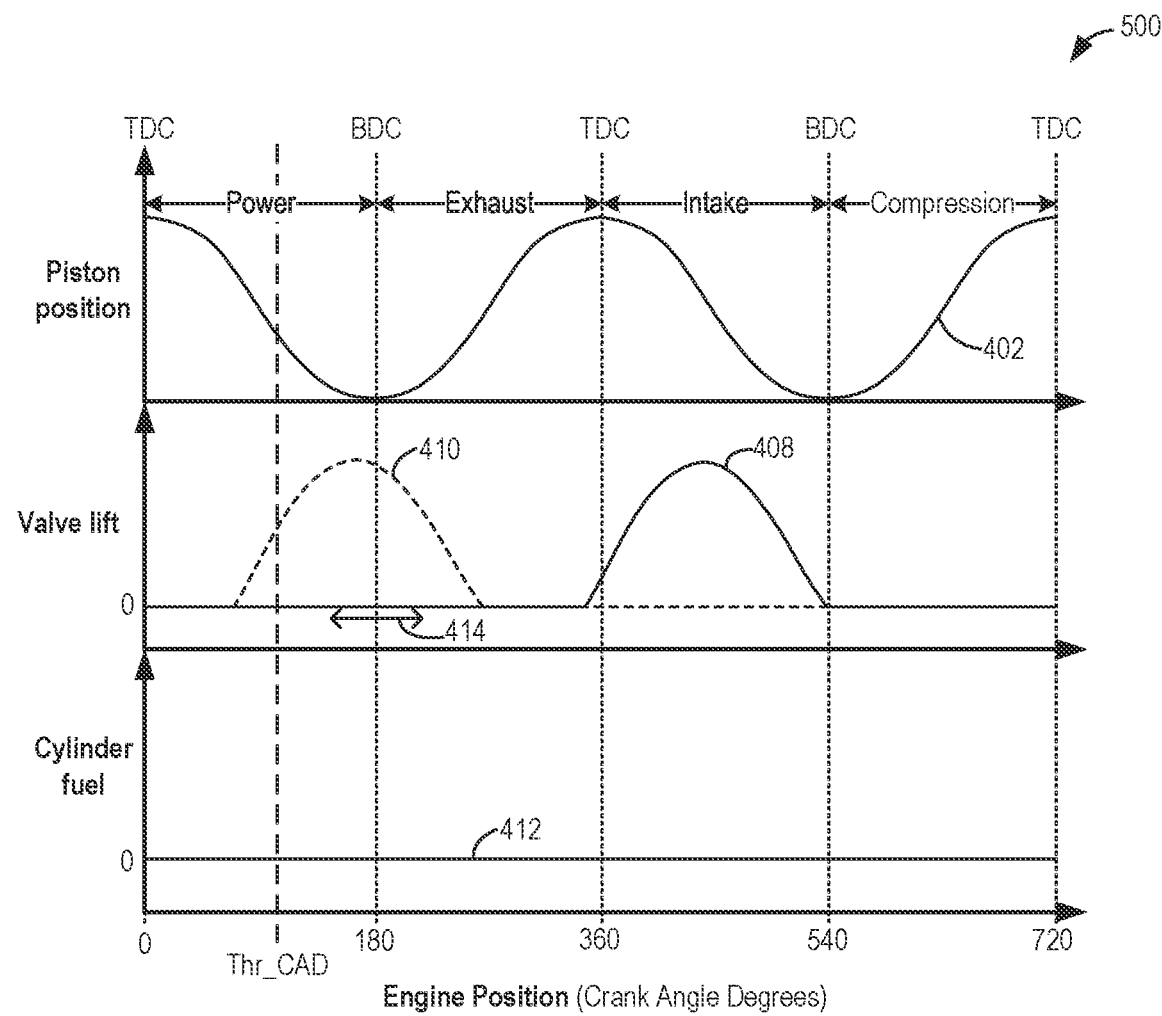
FIG. 5 shows an example timing chart of exhaust valve operation during engine braking.
Figure 6:
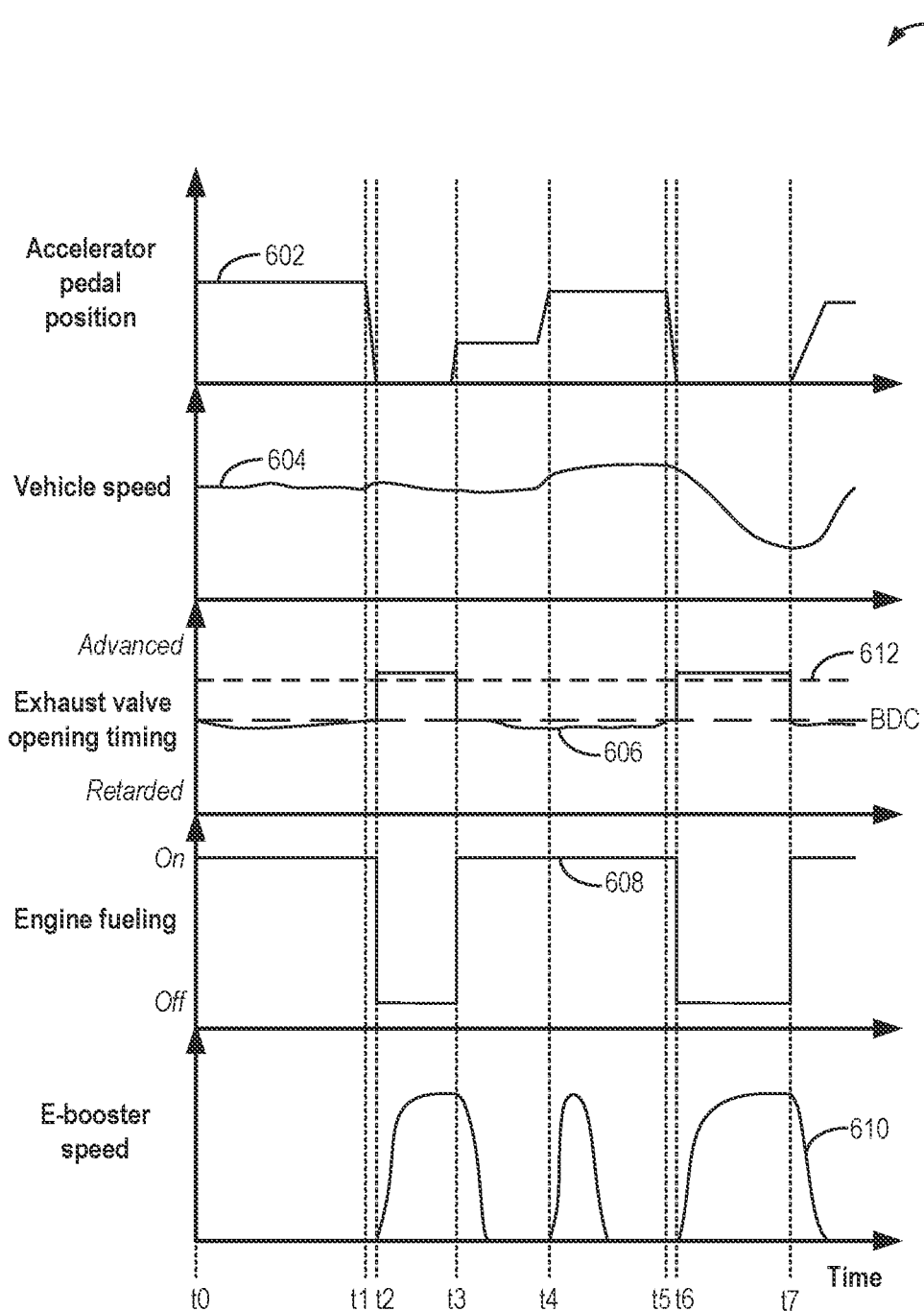
FIG. 6 shows a prophetic example timeline for adjusting an electric boosting device and exhaust valve timing during engine braking.

Continuing to FIG. 5, an exemplary timing chart 500 for operating the cylinder in an engine braking mode is shown. Similar to timing chart 400 of FIG. 4, timing chart 500 shows one cylinder cycle. Plots in FIG. 5 that correspond to the same parameters as described in FIG. 4 have the same reference numbers and will not be reintroduced. For example, the cylinder may be transitioned between operating in the combustion mode shown in FIG. 4 and the engine braking mode shown in FIG. 5 via adjustments to the Ti-VCT system (e.g., exhaust valve timing actuator 103 of FIG. 1B) responsive to a request for engine braking.

Even though combustion is discontinued in the engine braking mode, the piston continues to move up and down within the cylinder. Therefore, plot 402 of FIG. 5 does not experience any change in the engine braking mode as compared to the combustion mode shown in timing chart 400 of FIG. 4. Further, the intake valve may be operated similarly (plot 408) to induct high-pressure air generated by operating an electric boosting device (e.g., electric supercharger 13 of FIG. 1A). Upon intake valve closing at the beginning of the compression stroke, the piston compresses the higher air charge (e.g., higher than if the electric boosting device were not used) as the piston moves toward TDC (plot 402), absorbing energy from the engine. Unlike timing chart 400 of FIG. 4, in FIG. 5, plot 412 shows that fuel is no longer injected during the compression stoke of the cylinder cycle, as combustion is not performed in the cylinder.

The exhaust valve opening timing is highly advanced relative to the nominal exhaust valve opening timings of threshold timing range 414. In the example shown in FIG. 5, the exhaust valve begins to open approximately midway through the power stroke (dashed plot 410), before the threshold crank angle Thr_CAD. As a result, the compressed air within the cylinder is pushed out through the open exhaust valve. As a result, the compressed air does not remain within the cylinder to push the piston down to BDC (plot 402). Instead, the piston is moved back down to BDC using energy from the engine. As a result, the power stroke does not produce torque due to releasing the compressed air, and engine braking is magnified.

In this way, negative braking torque may be produced to slow the engine and vehicle. Note that the valve opening timings, closing timings, and lift amounts shown in FIG. 5 are exemplary, and other intake and exhaust valve opening timings, closing timings, and lift amounts that facilitate engine braking may be used without departing from the scope of this disclosure. As one example, the exhaust valve opening timing may be further advanced or less advanced within the power stroke while still remaining more advanced than the threshold crank angle Thr_CAD.

Next, FIG. 6 shows an example timeline 600 of using an e-booster (e.g., electric supercharger 13 shown in FIG. 1A) and a variable exhaust valve timing mechanism (e.g., a Ti-VCT system) to perform engine braking in a vehicle. The engine and the vehicle may be engine 10 and vehicle 102, respectively, of FIGS. 1A and 1B. An accelerator pedal position is shown in a plot 602, a vehicle speed is shown in a plot 604, an exhaust valve opening timing is shown in a plot 606, engine fueling is shown in a plot 608, and a speed of the e-booster (e.g., a speed of a compressor of the e-booster) is shown in a plot 610.

For all of the above, the horizontal axis represents time, with time increasing along the horizontal axis from left to right. The vertical axis of each plot represents the corresponding labeled parameter. For plots 602, 604, and 610, the labeled parameter increases along the vertical axis from bottom to top. For plot 602, a positive accelerator pedal position corresponds to a pedal (e.g. accelerator pedal 116 shown in FIG. 1B) being depressed. When the accelerator pedal position is at zero, the pedal is in a neutral position. For plot 606, the vertical axis shows the exhaust valve opening as being advanced or retarded relative to a dashed line representing BDC of a power stroke, as labeled. For plot 608, the vertical axis shows whether the engine fueling is on (e.g., fuel is delivered to at least one cylinder of the engine for combustion) or off (e.g., fuel is not delivered to any cylinder of the engine, and combustion is discontinued), as labeled.

From time t0 to time t1, the accelerator pedal position is kept constant (plot 602), indicating a constant driver-demanded torque to operate the vehicle at a consistent, non-zero vehicle speed (plot 604). During this time, since there is no request for braking, the exhaust valve opening timing (plot 606) fluctuates near BDC, such as at a beginning of an exhaust stroke and within a threshold timing range for facilitating combustion (e.g., as described above with respect to FIGS. 2 and 4). Further, engine fueling (plot 608) is on in order to provide fuel to each cylinder for combustion. Additionally, from time t0 to time t1, the e-booster is off, with a speed of zero (plot 610), as neither a transient change in boost (e.g., due to a tip-in) nor engine braking is occurring.

At time t1, the vehicle beings a downhill descent, as anticipated by a controller (e.g., controller 12 of FIGS. 1A and 1B), and a tip-out event occurs, where the accelerator pedal position (plot 602) changes from the depressed position to the undepressed, neutral position. As a result of the tip-out and the downhill descent, engine braking is desired. In particular, the controller may use the engine braking to maintain the speed of the vehicle during the downhill descent instead of enabling the vehicle to accelerate due to gravity with reduced usage of mechanical brakes. In response, at time t2, the engine fueling is turned off (plot 608) so that combustion is discontinued within the engine. The e-booster speed (plot 610) is quickly increased from zero as the e-booster compressor is spun up by an electric motor. As a result, a greater air mass is delivered to the engine, which increases an amount of work performed during compression. Further, at time t2, the exhaust valve opening timing is advanced (plot 610) further than a threshold timing for engine braking shown by a dashed line 612. As described above with respect to FIGS. 2 and 5, the advanced exhaust valve timing reduces an amount of power produced during each power stroke.

At time t3, the accelerator pedal position starts to increase (plot 602) as the vehicle operator depresses the pedal, indicating a request for driver-demanded torque after completion of the downhill descent. In response to the driver-demanded torque, engine fueling (plot 608) is resumed so combustion can be performed in each cylinder to produce torque. To facilitate this process, the exhaust valve opening timing (plot 606) is adjusted to be at or near BDC, allowing for torque production during the power stroke without prematurely releasing the combustion gases as the piston in each cylinder is driven toward BDC. Further, the e-booster is deactivated and allowed to spin down to rest (plot 610), as excess boost is not requested.

At time t4, the accelerator pedal position (plot 602) increases, indicating a tip-in event. In response to the tip-in, the e-booster is temporarily operated at a non-zero speed (plot 610) to provide increased boost until a turbocharger of the vehicle spins up (not shown). Further, the vehicle speed increases (plot 604) in accordance with the demanded torque increase.

At time t5, another tip-out event occurs (plot 602), and engine braking is requested to decrease the vehicle speed according to the decreased operator demand. In response, at time t6, combustion is discontinued in the engine by turning off the engine fueling (plot 608), and the e-booster is accelerated (plot 610) to increase the compressed air mass in each cylinder. Further, at time t6, the exhaust valve opening timing is advanced (plot 610) further than the threshold timing for engine braking (dashed line 612). As a result, the engine uses more energy during compression than is gained during the power stroke, and the vehicle speed (plot 604) decreases between time t6 and time t7.

At time t7, another tip-in event occurs (plot 602). In response, engine fueling (plot 608) is resumed at time t7, and the exhaust valve opening timing (plot 606) is again adjusted to be at or near BDC. Further, the e-booster is deactivated and allowed to spin down to rest (plot 610) as the turbocharger spins up to provide boost in accordance with the increased operator demand. Because engine braking is no longer performed and the engine generates positive torque, the vehicle speed increases (plot 604).

In this way, an e-booster may be used in combination with an advanced exhaust valve opening timing to increase an amount of energy used by an engine of a vehicle above that produced by the engine. As a result, the engine generates a braking force to slow the vehicle with reduced usage of friction brakes and without down-shifting. Additionally, the e-booster may increase a load on the engine by drawing current from an alternator or other current generating device mechanically coupled to the engine, which may further increase an amount of brake torque produced by the engine. By increasing engine braking using the e-booster, friction brake degradation, including brake fade, may be reduced. Further, engine degradation and NVH concerns may be reduced by reducing the usage of down-shifting for engine braking. Further still, the e-booster may be more frequently utilized, increasing the utility of the e-booster relative to its cost. Additionally, a controller may anticipate a downhill descent to quickly transition to engine braking for an even further reduce usage of the friction brakes. As a result, a lifetime of the friction brakes may be increased.

The technical effect of increasing a boost pressure delivered to an engine via an electric boosting device and advancing an exhaust valve opening timing to be early within a power stroke while combustion is discontinued in the engine is that a braking torque produced by the engine is increased.

As one example, a method comprises, in response to a request for engine braking: deactivating fueling to at least one cylinder of an engine, increasing an air mass provided to the engine via an electric boosting device, and adjusting an exhaust valve opening timing of the at least one cylinder. In a first example of the method, adjusting the exhaust valve opening timing of the at least one cylinder comprises advancing the exhaust valve opening timing of the at least one cylinder within a power stroke of the at least one cylinder. In a second example of the method, optionally including the first example, advancing the exhaust valve opening timing of the at least one cylinder within the power stroke of the at least one cylinder comprises advancing the exhaust valve opening timing to at least a threshold crank angle before bottom dead center of the power stroke of the at least one cylinder. In a third example of the method, optionally including one or both of the first and second examples, the threshold crank angle before bottom dead center of the power stroke of the at least one cylinder is outside of a threshold timing range for adjusting the exhaust valve opening timing while the at least one cylinder is fueled. In a fourth example of the method, optionally including any or all of the first through third examples, increasing the air mass provided to the engine comprises operating a compressor of the electric boosting device at a non-zero speed via an electric motor, the electric motor drawing current from either a regeneration device or a battery based on a requested brake torque of the request for engine braking and a state of charge of the battery. In a fifth example of the method, optionally including any or all of the first through fourth examples, the compressor is positioned in a bypass passage coupled to an intake passage of the engine, and increasing the air mass provided to the engine via the electric boosting device further comprises directing a larger portion of intake air to the compressor by fully closing a bypass valve positioned in the intake passage between an inlet of the bypass passage and an outlet of the bypass passage. In a sixth example of the method, optionally including any or all of the first through fifth examples, the engine is included in a vehicle, and the request for engine braking is responsive to an anticipated downhill descent of the vehicle. In a seventh example of the method, optionally including any or all of the first through sixth examples, the anticipated downhill descent of the vehicle is determined based on learned driving routes of the vehicle. In an eighth example of the method, optionally including any or all of the first through seventh examples, the anticipated downhill descent of the vehicle is determined based on global positioning data.

As another example, a method comprises: responsive to a request for engine braking of an engine, operating an electric boosting device and advancing an exhaust valve opening timing to at least a threshold crank angle within a power stroke of a corresponding cylinder while discontinuing combustion in the engine. In a first example of the method, operating the electric boosting device comprises operating a compressor of the electric boosting device at a non-zero speed via an electric motor, the non-zero speed increasing as a brake torque of the request for engine braking increases until a maximum speed is reached. In a second example of the method, optionally including the first example, the threshold crank angle within the power stroke of the corresponding cylinder is outside of an exhaust valve opening timing range used during combustion in the engine. In a third example of the method, optionally including one or both of the first and second examples, advancing the exhaust valve opening timing to at least the threshold crank angle within the power stroke of the corresponding cylinder comprises further advancing the exhaust valve opening timing as a requested brake torque of the request for engine braking increases until a maximum advancement is reached. In a fourth example of the method, optionally including any or all of the first through third examples, advancing the exhaust valve opening timing includes advancing a phase angle of an exhaust camshaft via a variable cam timing system. In a fifth example of the method, optionally including any or all of the first through fourth examples, the engine is included in a vehicle, and the request for engine braking of the engine is responsive to a downhill descent of the vehicle. In a sixth example of the method, optionally including any or all of the first through fifth examples, the downhill descent of the vehicle is determined by comparing a current driving route of the vehicle to learned driving routes of the vehicle.

As another example, a system comprises: an engine including a plurality of cylinders, each of the plurality of cylinders including an exhaust valve, a compressor positioned in an intake passage of the engine and driven by an electric motor, and a controller including instructions stored in non-transitory memory that, when executed, cause the controller to: provide engine braking by increasing a boost pressure provided to the engine via the compressor while discontinuing combustion in a number of the plurality of cylinders and adjusting an opening timing of the exhaust valve of each of the number of the plurality of cylinders, the number of the plurality of cylinders determined based on a requested brake torque. In a first example of the system, increasing the boost pressure provided to the engine via the compressor comprises adjusting an amount of electrical power supplied to the electric motor to drive the compressor at a desired speed determined based on the requested brake torque. In a second example of the system, optionally including the first example, the system further comprises: an electric generator mechanically coupled to the engine and electrically coupled to a battery, and wherein the amount of electrical power supplied to the electric motor is provided directly by the electric generator while a state of charge of the battery is less than an upper charge threshold and from the battery while the state of charge of the battery is greater than or equal to the upper charge threshold. In a third example of the system, optionally including one or both of the first and second examples, the system further comprises: a variable cam timing (VCT) system, wherein adjusting the opening timing of the exhaust valve of each of the number of the plurality of cylinders comprises advancing the opening timing of the exhaust valve of each of the number of the plurality of cylinders to a timing between top dead center of a power stroke of a corresponding cylinder and a threshold crank angle before bottom dead center of the corresponding cylinder, wherein the threshold crank angle is outside of an exhaust valve opening timing range used during combustion via the VCT system.

In another representation, a method for a vehicle comprises: discontinuing combustion in an engine of the vehicle and transiently increasing a boost pressure provided to the engine responsive to a downhill descent during a drive cycle of the vehicle. The method additionally or optionally further comprises advancing an exhaust valve opening timing to at least a threshold crank angle within a power stroke of a corresponding cylinder responsive to the downhill descent. In one or both of the preceding examples, transiently increasing the boost pressure provided to the engine comprises operating an electric boosting device. In any or all of the preceding examples, additionally or optionally, operating the electric boosting device comprises driving a compressor of the electric boosting device via an electric motor that draws current from a generator mechanically coupled to the engine. In any or all of the preceding examples, the method additionally or optionally further comprises advancing an intake valve opening timing, a degree of advancing the intake valve opening timing less than a degree of advancing the exhaust valve opening timing. In any or all of the preceding examples, additionally or optionally, the downhill descent is anticipated based on stored driving route data. In any or all of the preceding examples, additionally or optionally, the downhill descent is anticipated based on global positioning data. In any or all of the preceding examples, additionally or optionally, discontinuing combustion in the engine comprises discontinuing combustion in every cylinder of the engine. In any or all of the preceding examples, additionally or optionally, discontinuing combustion in the engine comprises discontinuing combustion in a first number of cylinders in the engine while maintaining combustion in a second, remaining number of cylinders in the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine including a plurality of cylinders, each of the plurality of cylinders including an exhaust valve;
a compressor positioned in an intake passage of the engine and driven by an electric motor; and
a controller including instructions stored in non-transitory memory that, when executed, cause the controller to:
provide engine braking by increasing a boost pressure provided to the engine via the compressor while discontinuing combustion in a number of the plurality of cylinders and adjusting an opening timing of the exhaust valve of each of the number of the plurality of cylinders, the number of the plurality of cylinders determined based on a requested brake torque.

2. The system of claim 1, wherein increasing the boost pressure provided to the engine via the compressor comprises adjusting an amount of electrical power supplied to the electric motor to drive the compressor at a desired speed determined based on the requested brake torque.

3. The system of claim 1, further comprising an electric generator mechanically coupled to the engine and electrically coupled to a battery, and wherein the amount of electrical power supplied to the electric motor is provided directly by the electric generator while a state of charge of the battery is less than an upper charge threshold and from the battery while the state of charge of the battery is greater than or equal to the upper charge threshold.

4. The system of claim 1, further comprising a variable cam timing (VCT) system, wherein adjusting the opening timing of the exhaust valve of each of the number of the plurality of cylinders comprises advancing the opening timing of the exhaust valve of each of the number of the plurality of cylinders to a timing between top dead center of a power stroke of a corresponding cylinder and a threshold crank angle before bottom dead center of the corresponding cylinder, wherein the threshold crank angle is outside of an exhaust valve opening timing range used during combustion via the VCT system.

* * * * *